(12) United States Patent
Chopra et al.

(10) Patent No.: US 6,286,976 B1
(45) Date of Patent: Sep. 11, 2001

(54) DOME LIGHT WITH REMOVABLE EMERGENCY LIGHT MODULE

(75) Inventors: Kewal K. Chopra; John W. Monroe, both of Macomb County, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/496,330

(22) Filed: Feb. 2, 2000

(51) Int. Cl.[7] .................................. F21L 4/08; F21S 8/10
(52) U.S. Cl. ......................... 362/183; 362/20; 362/490; 362/545; 315/77
(58) Field of Search .............................. 362/20, 183, 251, 362/394, 490, 543, 544, 545, 800; 315/76, 77, 84

(56) References Cited

U.S. PATENT DOCUMENTS

| | | | |
|---|---|---|---|
| 4,739,224 | * | 4/1988 | Geerlings .............................. 315/84 |
| 5,984,495 | * | 11/1999 | Roberts et al. ....................... 362/490 |
| 6,022,131 | * | 2/2000 | Morimoto et al. ................... 362/543 |

* cited by examiner

*Primary Examiner*—Alan Cariaso
(74) *Attorney, Agent, or Firm*—David L. Kuhn; Gail S. Soderling; Clifford C. Carter

(57) ABSTRACT

A vehicle interior lighting system for use in military vehicles to minimize infrared signatures under normal operating conditions. The system has a blackout reduced signature capability, emergency interior lighting capability and a removable portion with reduced thermal signature for use in evacuating a disabled vehicle.

1 Claim, 2 Drawing Sheets

DOME LIGHT WITH REMOVABLE EMERGENCY LIGHT MODULE

GOVERNMENT INTEREST

The invention described here may be made, used and licensed by the United States for governmental purposes without paying us any royalty.

BACKGROUND OF THE INVENTION

1. Field of the Invention

In one aspect this invention relates to vehicle lighting systems. In a further aspect this invention relates to a vehicle interior lighting system with emergency backup power.

2. Prior Art

The present dome lights in military vehicles are a source of infrared radiation which is in turn a source of danger from enemy or terrorist forces since most military operations are equipped with at least some form of rudimentary infrared sensing devices. The more sophisticated detection systems can use the infrared radiation from a vehicle both as detection and targeting means. Thus, it is in the interest of troop safety to minimize the infrared signature emanating from the interior of a vehicle. The present interior, dome light structures use incandescent lamps as a light source. Such lamps create a high infrared signature, have high current requirements on the order of 500 milliamperes and have a relatively short life on the order of 500 hours. To ameliorate the signature problem, present military vehicles use blackout filters on interior dome lights when operating in a blackout mode. This structure requires carrying and using a separate filter and creates a possible hazardous condition if the filter is not deployed. In a hostile zone failure to properly deploy blackout filters can endanger the vehicle and occupants.

It would be desirable to have a dome light system that is designed to have a consistent low infrared signature with improved lamp life and low current requirements. It would be a further advantage to have a backup power source for the passenger compartment lighting that could allow the dome light to function if there is a loss of power from the vehicle electrical supply. This would allow personnel to locate their weapons and exit the vehicle even when there is a loss of power.

SUMMARY OF THE INVENTION

Briefly the present invention provides a lowered infrared signature dome light assembly with reduced current requirements. The system has a backup power supply sufficient to provide a measure of emergency lighting to the vehicle passenger compartment should the primary vehicle battery system be disabled or discharged. In addition, the system provides a removable light source integrated with the backup power supply, which can be used to exit the vehicle. The removable light portion is an integrated as a part of the dome light assembly of this invention under normal conditions.

The present improved vehicle dome-emergency lighting system is normally mounted in a passenger compartment of a land vehicle having an electrical system containing at least one storage battery. The dome lighting system further includes a retention housing mounted on the roof of the vehicle the retention housing serving to hold the remainder of the components of the system in the desired configuration within the vehicle.

DETAILED DESCRIPTION

Figure 1:
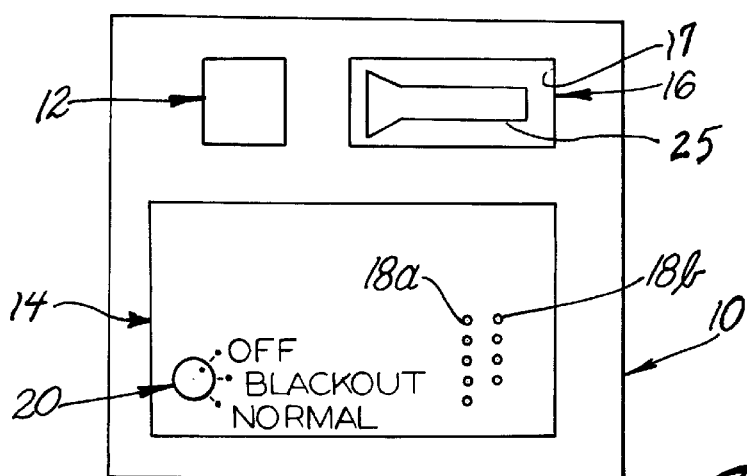
FIG. 1 is plan view of one embodiment of this invention.

Referring to the accompanying drawing in which like numerals refer to like parts and initially to FIG. 1, an overview of one device according to this invention adapted for mounting in a vehicle passenger compartment (not shown). The device has a mounting bracket 10 that will be attached to the vehicle in the upper portion of the passenger compartment such attachment methods for vehicle interiors being within the skill of the art. The mounting bracket 10 serves to hold the three remaining major subsystems of the dome light assembly of this invention within the vehicle and maintain an electrical connection between the dome light assembly and the vehicle's electrical system. A charging circuit 12, discussed in detail hereinafter, is adapted to take the current from the vehicle electrical system and condition it to the proper operating parameters for use by a dome light module 14 for interior lighting and an emergency light module 16 to maintain it in a fully charged condition.

The dome light module 14 comprises a plurality of LEDs 18, preferably yellow in color, which are divided into two distinct banks of LEDs. They are activated using a three-position, switch 20 which has an off position, normal position for normal night use, and a blackout position for use when infrared radiation must be minimized. The blackout position activates only a portion of the LEDs 18.

Figure 2:
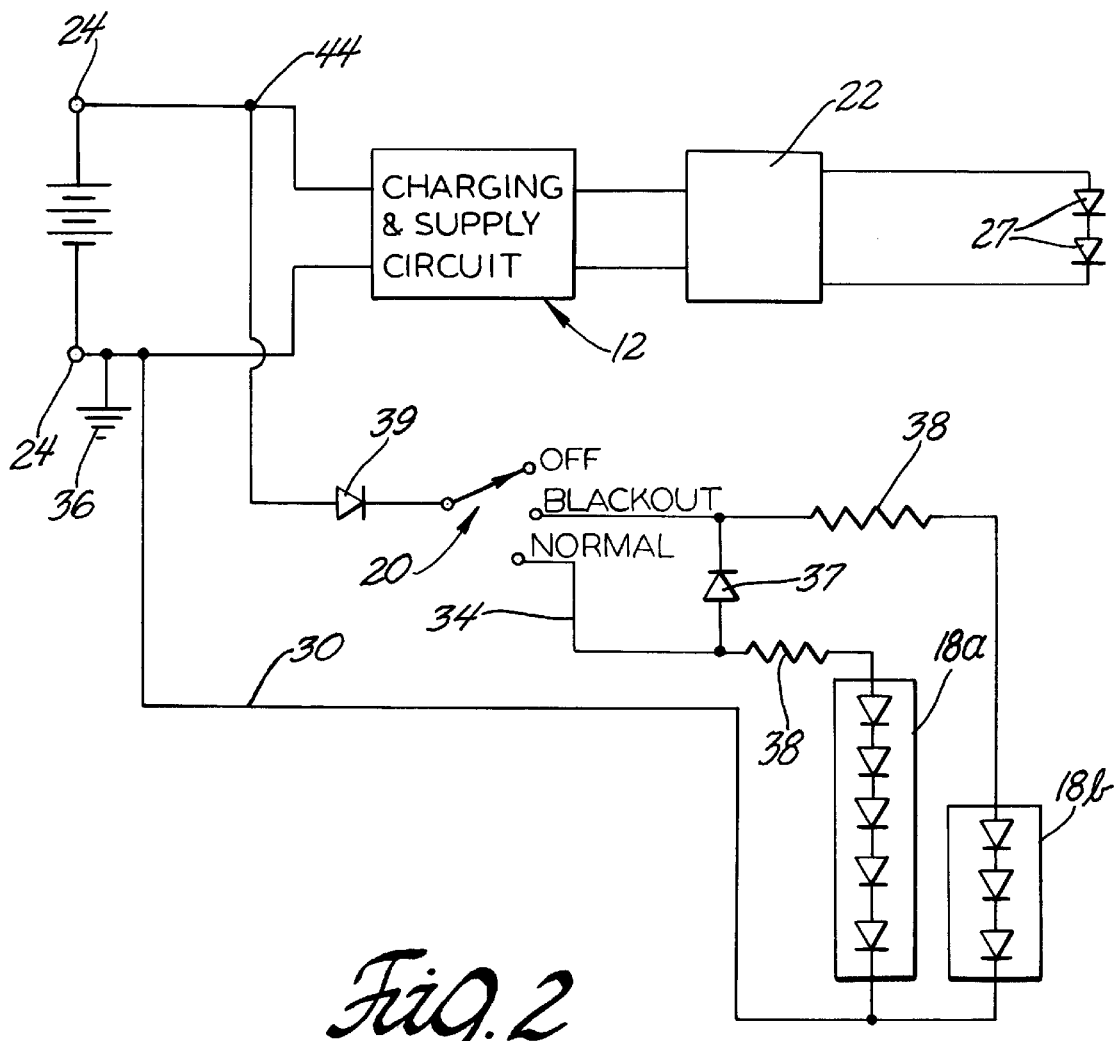
FIG. 2 is a circuit diagram for the device of FIG. 1, including the passenger compartment circuit.
Figure 3:
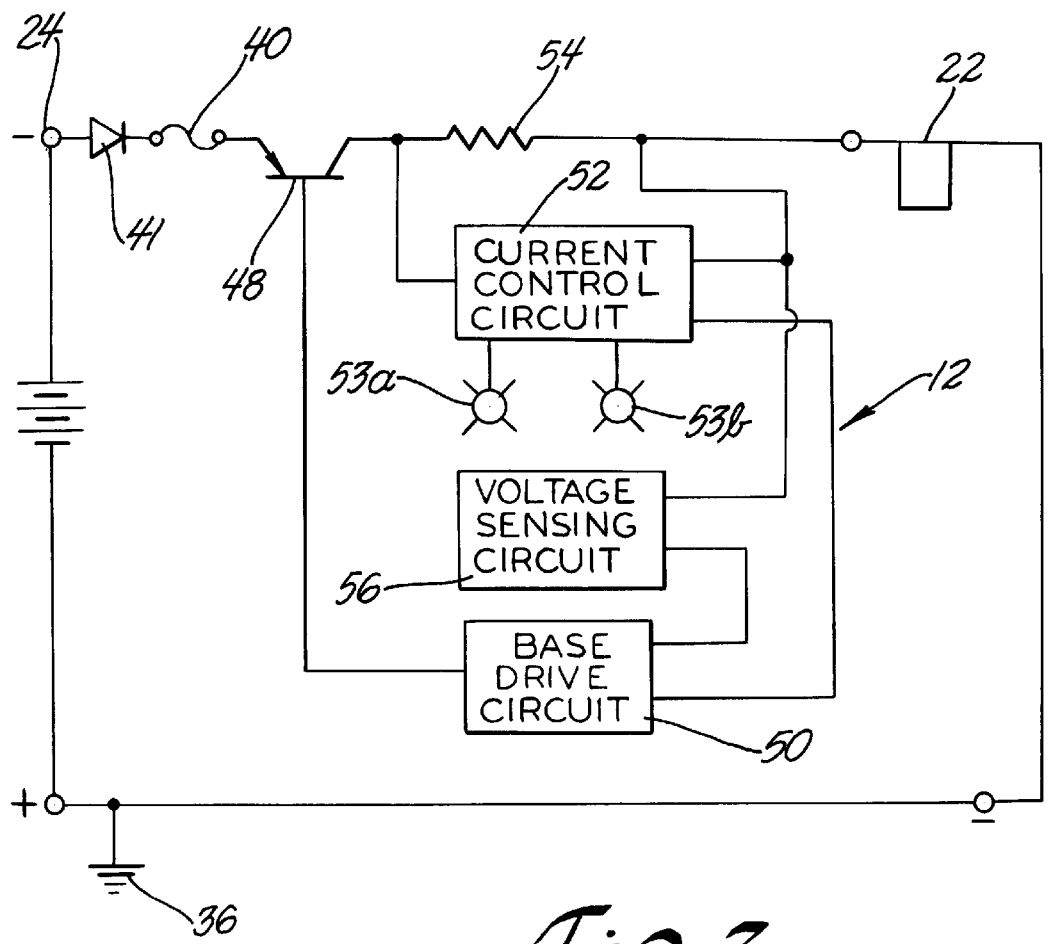
FIG. 3 is one example of a charging circuit useful in this invention.

Referring to FIG. 2 which shows the connection of the major subsystems diagramnmatically, the charging circuit 12, one example being shown in FIG. 3, will sense the charge condition of a rechargeable battery pack 22 which is in turn an integral part of the emergency light module 16. When the battery pack 22 has reached a degree of discharge requiring the battery pack to be refreshed, the charging circuit 12 will allow a conditioned current flow to the batteries until they are fully recharged. When the battery pack 22 indicates a full charge, the current flow to the batteries will be maintained at a reduced level to maintain a full charge under normal vehicle operating conditions.

The mounting bracket 10 has an electrical connection 24 to the vehicle's standard electrical system (not shown). The vehicle electrical system will provide current to connection 24 at its normal operating voltage which in automobiles is generally in the range of 12–14 Volts D.C. but in military and larger commercial vehicles can be in the range of 24–28 Volts D.C. Either of these voltages is substantially higher than the LED's or rechargeable batteries operating parameters so the charging circuit must condition the voltage and amperage to the proper operating parameters. This will avoid overcharging of the rechargeable batteries 22 of the emergency light 25 and avoid creating an over voltage on the dome light module LED's 18 which will cause premature failure. The rechargeable batteries 22 generally require about 4 volts DC and a current of 100 milliamperes when recharging to reach full charge in a reasonable length of time. The charging circuit 12 will have sensing means that determines when the batteries 22 are discharged to a condition that requires recharging and will reduce the current when the batteries are fully charged.

The rechargeable batteries 22 and other associated parts of the removable emergency light 25 are contained within recess 17 formed in housing 10. The removable emergency light 25 can of this invention has a body and battery structure similar to the nickel cadmium battery powered flashlights commonly available. However, in the present invention, the light source is furnished by LED's 27 similar to the LEDs 18 discussed before. By providing such a structure several benefits accrue to the soldiers in the field. One is life of the light source; the LEDs have a much longer life, up to several thousand times longer than incandescent bulbs. Further the batteries will be fresh at all times relieving soldiers of the necessity of carrying extra batteries. Batteries add additional weight to the solder's burden while providing only minimal backup safety since batteries degrade with age even when not used. Still further, using LEDs will provide the soldier with a light having reduced thermal signature and increased safety when evacuating a vehicle. The battery pack 22 of the removable emergency light 25 is electrically connected to the charging circuit whenever the removable light 25 is in its housing 16. This will maintain an electrical potential to the dome light circuit even if there is no current being applied to the connection 24 by the vehicle electrical circuit.

The dome light module 14 is directly connected to the vehicle electrical system at connection point 44 the power being used to energize the plurality of LED's 18. The LED's 18 are divided into two groups 18a and 18b as shown in FIG. 2, with the current to all LED's 18 controlled by the three position switch 20. Switch 20 in the off position maintains an open circuit and keeps the dome light off during normal operations. When normal interior light is necessary, the switch 20 is moved to the normal position and current passes from line 30 to connection points 31, 32, through both sets of the LED's 18a and 18b and via line 34 to ground 36. With the switch 20 in the normal position, current through set 18b of the LEDs, can flow through diode 37 to line 34 completing the circuit for this bank of LEDs. In the on position all the LED's 18a and 18b are lit providing a normal amount of interior light. Because the illumination furnished by the LEDs is spectral in nature, the lighting will produce only a minimal thermal signature even when all the LED's are lit.

In military vehicles it is desirable to be able to reduce the thermal signatures to still lower levels but still create sufficient interior illumination to function. In this case switch 20 is moved to the blackout position, a minimum light position. In this position, current will flow through LEDs 18b, resistor 38 and switch 20 to the ground 36. Diode 37 will block current flow through the LEDs 18a ensuring that only LEDs 18b are activated. This will result in an even further reduced thermal signature. As shown the blackout level represents about ⅜ of the normal interior light level. The diode 39 provides protection to the LEDs from reverse currents which might be generated and damage the circuit.

The battery pack 22 provides emergency lighting power to the LED's 18 in the event the vehicle main power source fails, providing power through the charging circuit 12 to node 44 and thence line 30 if the vehicle electrical system becomes discharged or inoperative. As a further safety feature, if the vehicle must be abandoned, the removable light 25 can be taken by the crew and used as portable, low thermal signature light source by the crew.

An example of one suitable charging circuit useful in the practice of this invention is represented in greater detail in FIG. 3. As shown in FIG. 3, current from lead 24 passes to a diode 41 that controls the direction of current can flow and then to fuse 40 that provides overload current fault protection. The current passes to a power transistor 48 which in turn controls the current flow and regulates the voltage in response to the voltage sensor circuit associated with the battery pack 22 which measures the voltage of the battery pack. A current control circuit 52 connected across a resistor 54 is designed to measure the voltage drop across the resistor and thereby sense the charging current flow. The current control circuit 52 will generate a signal proportional to the current flow, which is sent to base drive circuit drive 50 which adjusts the current flow through power transistor 48 to a level that avoids overheating the batteries 22. As shown, control circuit 52 has a pair of status LED's 53a and 53b showing whether the battery pack 22 is charging or being maintained.

The battery pack 22 voltage is measured by a voltage sensing circuit 56 which will generate a signal proportional to the battery pack 22 charge status and allow greater current to flow when the battery is discharged while decreasing current flow to a minimum when the batteries are fully charged.

The base drive circuit 56 will receive signals from the current sensing circuit 52 and the voltage sensing circuit 56 and analyze the inputs to determine the proper operating parameters to be applied to the battery pack 22. The results of the analysis are converted to an electrical signal to be applied to the base of power transistor 48 so the proper current flow is maintained.

Various alterations and modifications will become apparent to those skilled in the art without departing from the scope and spirit of this invention and it is understood this invention is limited only by the following claims.

What is claimed is:

1. A vehicle dome emergency light combination for use in a vehicle passenger compartment, the vehicle having an electrical system including at least one storage battery including:

a retention housing mounted on the roof of the vehicle passenger compartment, the retention housing serving to hold components of the dome-emergency light combination, the retention housing being electrically connected to the electrical system;

a plurality of high intensity light emitting diodes arranged as two distinct banks and mounted in the housing, the plurality of diodes serving as a dome light to illuminate the interior of the vehicle when activated;

a three position switch interposed in the electrical system the switch having an off position which disconnects the light emitting diodes from the electrical circuit, a second position that activates the entire plurality of light emitting diodes to illuminate the vehicle interior, and a third position which activates only a portion of the plurality of light emitting diodes;

a charging circuit mounted within the mounting housing and connected to the vehicle battery system;

a removable emergency light mounted within the retention housing;

a rechargeable battery pack located within the removable emergency light, the battery pack being connected to the charging circuit located within the mounting housing, emergency light emitting diodes located on the removable emergency light;

a switch located between the emergency light emitting diodes and the rechargeable batteries;

an electrical connection between the rechargeable batteries and the three position switch serving to provide power to the plurality of diodes when the normal vehicle battery system is disabled.

* * * * *